United States Patent [19]

Green

[11] Patent Number: 5,464,114

[45] Date of Patent: Nov. 7, 1995

[54] CAP FOR GAS OUTLET NOZZLES

[76] Inventor: Garrey D. Green, 31 Georgian Cres., Kitchener, Ontario, Canada, N2B 3N8

[21] Appl. No.: 288,240

[22] Filed: Aug. 9, 1994

[51] Int. Cl.$^6$ .......................... B65D 55/14; B65D 45/00; F16L 35/00
[52] U.S. Cl. .......................... 220/284; 220/210; 220/725; 215/207; 215/215; 215/279; 137/377; 137/800
[58] Field of Search .................................. 215/207, 215, 215/216, 225, 274, 275, 279, 280; 220/210, 284, 319, 725, 730; 137/377, 381, 382, 800

[56] References Cited

U.S. PATENT DOCUMENTS

| | | | |
|---|---|---|---|
| 1,839,662 | 1/1932 | Fairchild | 220/210 X |
| 3,371,809 | 3/1968 | Pompa | 215/215 |
| 3,526,332 | 9/1970 | Adelberger | 215/207 |
| 3,801,454 | 4/1974 | Kumpf | 220/284 X |
| 4,119,239 | 10/1978 | Anderson | 220/324 |
| 4,257,561 | 3/1981 | McKinney | 215/216 X |
| 4,687,112 | 8/1987 | Swartzbaugh | 215/216 |

Primary Examiner—Allan N. Shoap
Assistant Examiner—Nathan J. Newhouse
Attorney, Agent, or Firm—Rothwell, Figg, Ernst & Kurz

[57] ABSTRACT

A cap member for fitment over a gas outlet nozzle having a plurality of serrations on the exterior thereof, is disclosed. The cap member comprises a peripherally disposed main body portion spanning between an open first end and a closed second end. The main body portion has an outer surface defining the periphery of the cap member and an inner surface defining a nozzle receiving recess. A lock member having an arcuately shaped central portion terminating in opposed outwardly projecting first and second end tabs having a key-receiving gap therebetween is retained within an annular slot within the nozzle receiving recess. The lock member is resiliently deformable between a first locking configuration whereat, the central portion of the lock member is shaped and dimensioned to fit around a substantial portion of the gas outlet nozzle so as to be in interfering relation with a juxtaposed one of the serrations to thereby cause the cap member to be locked on the gas outlet nozzle, and a second unlocking configuration whereat, the central portion of the lock member is shaped and dimensioned to be removable over the serrations of the gas outlet nozzle so as to thereby permit the cap member to be removed from the gas outlet nozzle. An access passageway in the main body portion permits the key member to be inserted into the gap between the first and second end tabs so as to urge the lock member from its first locking configuration to its second unlocking configuration.

17 Claims, 3 Drawing Sheets

CAP FOR GAS OUTLET NOZZLES

FIELD OF THE INVENTION

This invention relates to gas outlet nozzles such as those used in laboratories or classrooms, and more particularly to caps for protecting the ends of such gas outlet nozzles and precluding foreign objects or matter from being inserted into the open end of such an outlet nozzle.

BACKGROUND OF THE INVENTION

Most modern laboratories and school science classrooms, among other science oriented facilities, have outlet nozzles for the controlled dispensing of a flow of natural gas into a burner apparatus, such as a bunsen burner. The actual nozzle outlet is elongated along a longitudinal axis, and is generally frustum shaped with the narrower diameter being at the outlet end. An orifice in the outlet end of the nozzle is in fluid communication with a source of natural (or other) gas so as to permit dispensing of the gas. Since these gas outlet nozzles are usually intended to feed a flow of gas at low pressures to a bunsen burner, which is connected to the nozzle using a flexible rubber hose, the exterior of the nozzle has a plurality of serrations founded therein to help keep the rubber hose retained thereon for delivery of the gas. Typically, at least in North America, the gas being supplied to laboratories and school science classrooms for use as fuel for bunsen burners is natural gas. However, there may be circumstances such as in remote districts, where manufactured or bottled gas is required to be used.

Typically, the serrations have a back face that is generally perpendicular to the longitudinal axis of the nozzle, and have a front face that is angled with respect to the longitudinal axis of the nozzle. Accordingly, it is relatively easy to slip a rubber hose onto the nozzle, but is more difficult to slip the rubber hose off of the nozzle.

A problem exists with these types of nozzles, especially in schools, in that it is relatively easy to deposit foreign objects or matter, such as gum, candy wrappers, pencil stubs, etc., into the open end of a natural gas outlet nozzle, thus rendering the nozzle unusable, or at least dangerous to use. Further, it is also possible for small insects to enter the open end of the nozzle, which is undesirable.

It is extremely difficult, and possibly dangerous, to remove such foreign objects and matter from the open end of the nozzle. It is especially dangerous, and contrary to safety code regulations, to use a drill or twist bit to remove the offending foreign matter from the interior of the nozzle. Presently, what is typically done to remedy this problem is that the nozzle is replaced. However, replacement of this type of nozzle costs in the order of $50.00 per replacement, which is prohibitively expensive.

What is needed is means to preclude unwanted foreign objects or matter from entering or being otherwise deposited into the open end of a gas nozzle.

DESCRIPTION OF THE PRIOR ART

One solution, as proposed in co-pending U.S. patent application Ser. No. 08/240,524—of which the present inventor is a co-inventor—, is to provide a cap member for fitment over a gas outlet nozzle having a plurality of serrations on the exterior thereof. The cap member comprises a peripherally disposed main body portion having an inner surface and an outer surface, with the inner surface defining a nozzle receiving recess. There is an open first end, a generally closed second end, and a lock member mounted in operative relation to the main body portion. The lock member is made from sheet metal material and has a pair of projecting lock portions thereon. Each of the projecting lock portions are moveable between a first locking position and a second unlocking position. When the cap member is in place on the gas outlet nozzle and the projecting lock portions are each in their first locking position, the projecting lock portions project into the nozzle receiving recess so as to each be in interfering relation with one of the plurality of serrations on the exterior of the gas outlet nozzle, so as to thereby lock the cap member in place and preclude the cap member from being removed from the nozzle. When the cap member is in place on the gas outlet nozzle and the projecting lock portions are each in their first locking position, the projecting lock portions are removed from interfering relation with the serrations so as to no longer be in interfering relation with the serrations. Accordingly, the cap member can be moved along the gas outlet nozzle, so as to ultimately permit removal of the cap member therefrom. A key member having a central blade portion and a pair of structural flanges disposed one each along each edge of the blade portion, is used to move the projecting lock portions from their respective first locking positions to their respective second unlocking positions. The blade portion is extremely thin so as to fit between the gas outlet nozzle and the inner surface of the main body portion. The structural flanges provide reinforcement for the thin blade portion. The cap member further comprises an access passageway in the peripherally disposed main body portion, which access passageway has a pair of parallel slots therein to removably receive the flanges of the key member therein, so as to permit access by the key member to the projecting lock portions of the lock member, to thereby allow the key member to contact and thereby move the projecting lock portions from their respective first locking positions to their respective second unlocking positions.

The present invention improves on this prior art by providing a cap member with a locking member that is easier and less expensive to manufacture, and, during use, is more robust and provides for greater contact with the serrations.

SUMMARY OF THE INVENTION

In accordance with one aspect of the present invention, there is provided a cap member for fitment over a gas outlet nozzle having a plurality of serrations on the exterior thereof. The cap member comprises an open first end and a generally closed second end, and a peripherally disposed main body portion spanning between the first end and the second end. The peripherally disposed main body portion has an outer surface defining the periphery of the cap member and an inner surface defining a nozzle receiving recess extending inwardly from a first end concurrent with the open first end of the cap member to a second end concurrent with the closed second end of the cap member. A lock member is operatively retained within the nozzle receiving recess, the lock member having a slender elongate arcuately shaped central portion terminating in opposed outwardly projecting first and second end tabs having a key-receiving gap therebetween. The lock member is resiliently deformable between a first locking configuration whereat, when the cap member is in place on the gas outlet nozzle, the central portion of the lock member is shaped and dimensioned to fit around a substantial portion of the gas outlet nozzle so as to be in interfering relation with a juxtaposed one of the serrations so as to thereby cause the cap member to be locked on the gas outlet nozzle, and a second unlocking configuration whereat, when the cap member is in place on the gas outlet nozzle, the central portion of the lock member is shaped and dimensioned to be removable over the serrations of the gas outlet nozzle so as to thereby permit the cap member to be removed from the gas outlet nozzle. An access passageway in the peripherally disposed main body portion is shaped and dimensioned so as to removably receive a co-operating key member therein, and thereby permit the key member to be inserted into the gap between the opposed outwardly projecting first and second end tabs. The key member is shaped and dimensioned to urge the opposed outwardly projecting first and second end tabs from a first rest position corresponding to the first locking configuration of the lock member to a second biased position corresponding to the second unlocking configuration of the lock member, upon insertion of the key member into the gap between the opposed outwardly projecting first and second end tabs.

BRIEF DESCRIPTION OF THE DRAWINGS

Embodiments of this invention will now be described by way of example in association with the accompanying drawings in which.

DETAILED DESCRIPTION OF THE PREFERRED EMBODIMENTS

Reference will now be made to FIGS. 1 through 7 to describe the cap member 30 of the present invention, and to further describe how the cap member of the present invention fits over a gas outlet nozzle 20 and locks in place thereon.

Figure 1:
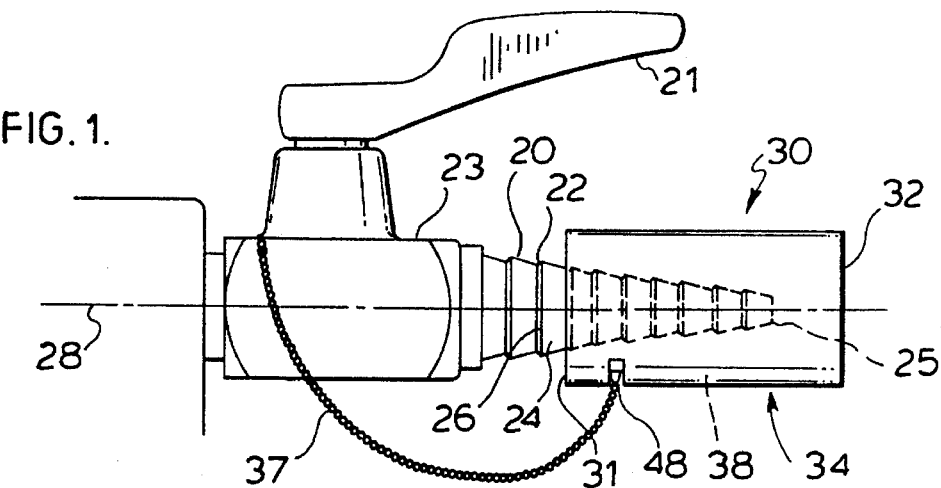
FIG. 1 is a side elevational view of the cap member of the present invention installed on a gas outlet nozzle.
Figure 2:
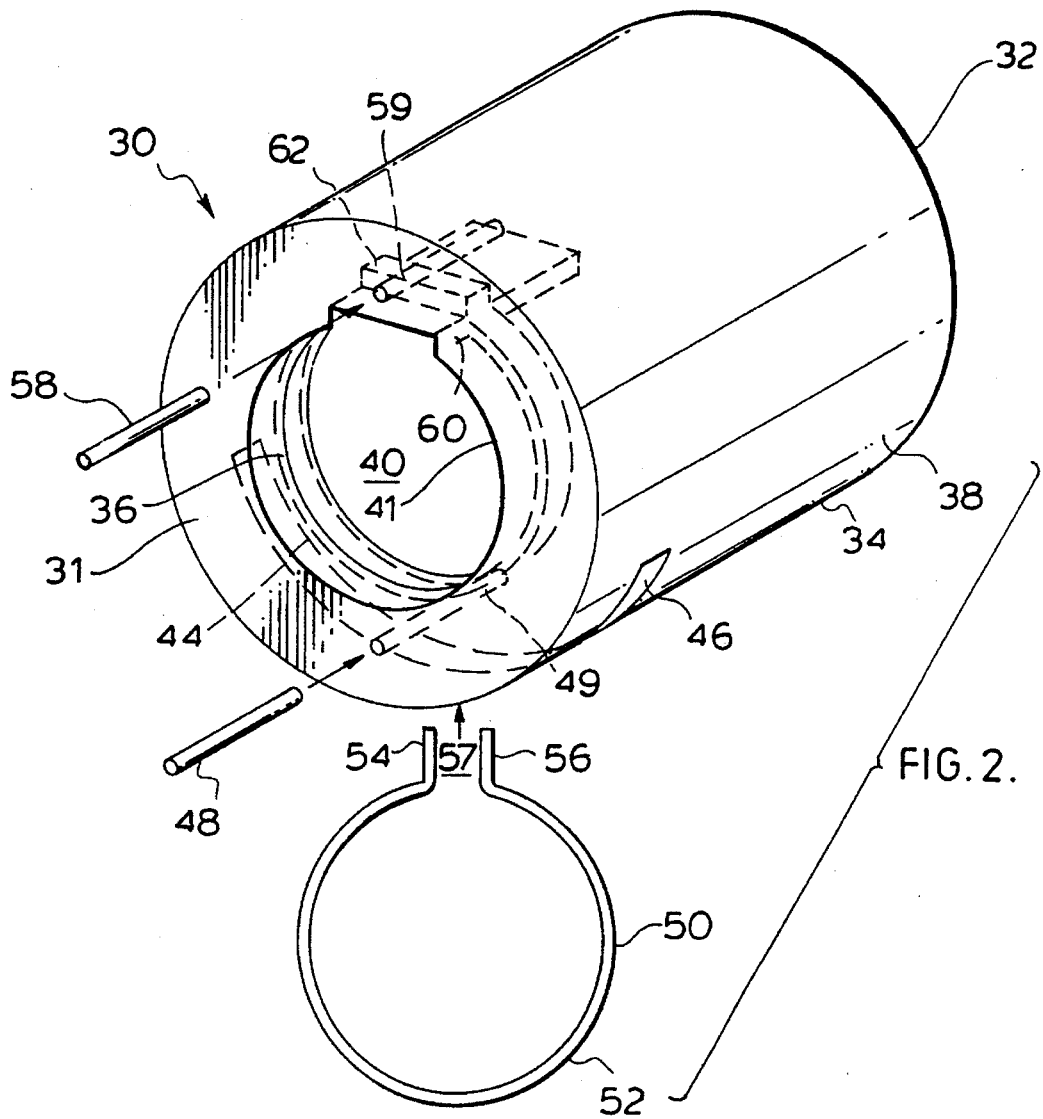
FIG. 2 is an exploded perspective view of the cap member of FIG. 1, not installed on a gas outlet nozzle.
Figure 3:
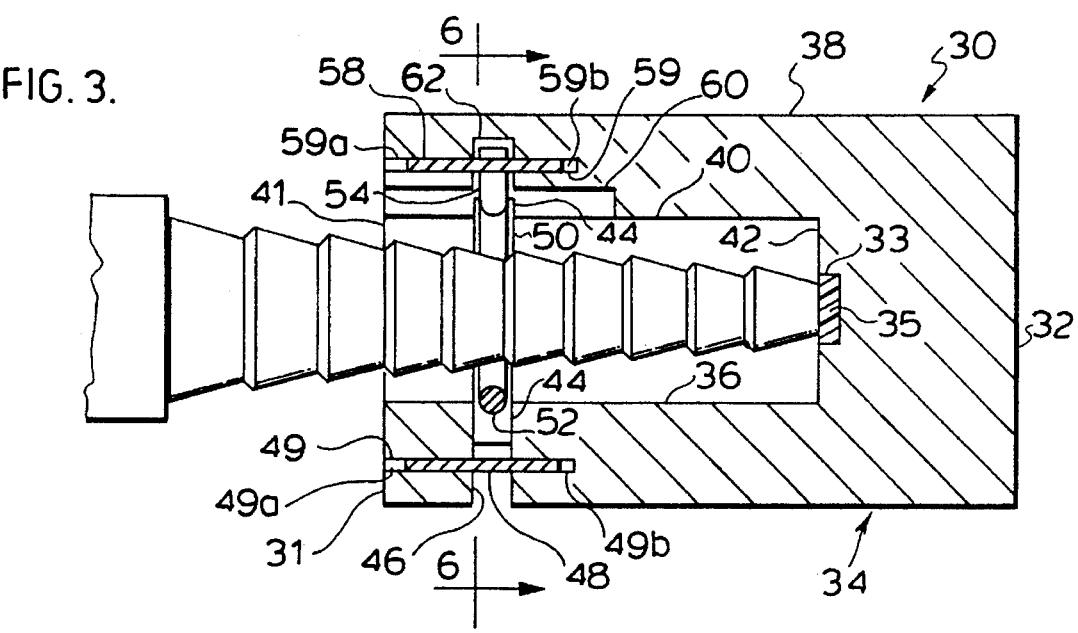
FIG. 3 is an enlarged sectional side view of the cap member of FIG. 2, when in place on a gas outlet nozzle.
Figure 4:
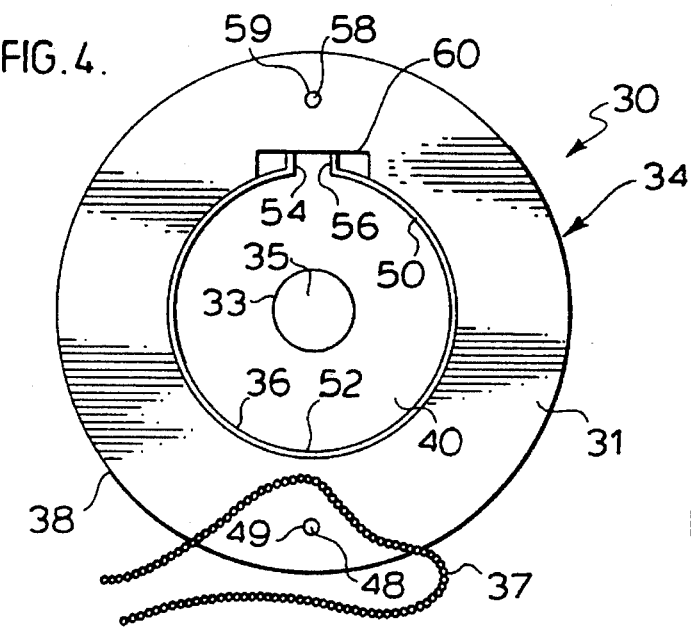
FIG. 4 is an end view of the cap member of FIG. 2 showing the first end thereof.
Figure 5:
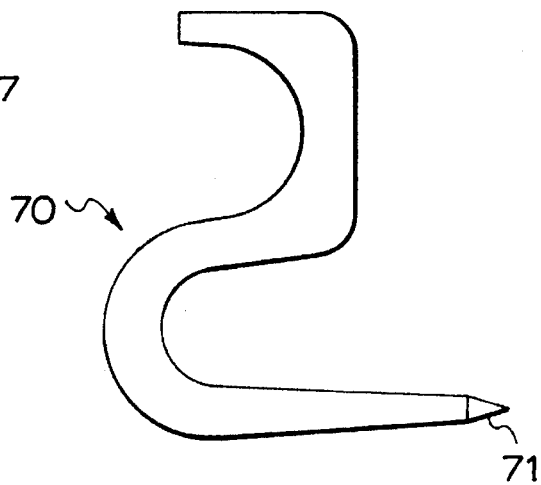
FIG. 5 is a side plan view of the key member.

As can best be seen in FIG. 1, the gas outlet nozzle 20 is a horizontally disposed elongated structure having a generally tapered shape extending outwardly from the gas outlet base 23. A gas flow control handle 21 is pivotally mounted on the gas outlet base 23 at the top thereof so as to permit control of the flow of natural (or other) gas. The nozzle 20 has a plurality of serrations 22 on the exterior thereof. These serrations 22 each have a back face 26 that is generally perpendicular to the longitudinal axis 28 of the nozzle 20, and have a front face 24 that is angled with respect to the longitudinal axis 28 of the nozzle 22. The manner in which the serrations 22 are angled makes it easier to connect a rubber hose, such as a hose leading to a bunsen burner, onto the nozzle 20 and makes it more difficult to subsequently remove the rubber hose from the nozzle 20.

The cap member 30 has an open first end 31 and a generally closed second end 32. The cap member 30 is, of course, introduced to the gas outlet nozzle 20 such that the distal end 25 of the gas outlet nozzle 20 is received first into the open first end 31. The closed second end 32 is disposed at the distal end 25 of the gas outlet nozzle 20, when the cap member 30 is in place on the gas outlet nozzle 20. A peripherally disposed main body portion 34 spans between the first end 31 and the second end 32. The peripherally disposed main body portion 34 has an inner surface 36 and an outer surface 38. The inner surface 36 defines a nozzle receiving recess 40 extending from its first end 41 that is co-planar with the open first end 31 of the cap member 30 to its second end 42 that is co-planar with the closed second end 32 of the cap member 30. A key receiving access hatch 57 that is shaped and dimensioned to receive a key member 70 therein, as will be discussed in greater detail subsequently, extends radially outwardly from the nozzle receiving recess 40 and is in open communication therewith. The main body portion 34 is preferably solid, with no perforations, to thereby preclude unwanted access to the nozzle receiving recess 40 and is preferably made from a strong material, such as a metal material, preferably a brass material. The outer surface 38 defines the periphery of the cap member and, in the preferred embodiment, is generally cylindrical, which permits the main body portion 34 to be manufactured from standard one and one-half inch diameter brass stock, so as to minimize the amount of fabrication required to produce the cap member 30.

The nozzle receiving recess 40 is shaped and dimensioned to receive the gas outlet nozzle 20 therein, and should be of a diameter only slightly greater than the widest diameter of the portion of the gas outlet nozzle that the cap member 30 fits over in order to keep the cap member 30 from being laterally moveable on the gas outlet nozzle 20. Further, such close fitment helps preclude unwanted access to the nozzle receiving recess 40, thereby minimizing the chance of the internal working components of the cap member 30, as discussed below, from being tampered with.

A lock member 50 has a slender elongate arcuately shaped central portion 52 terminating in opposed outwardly projecting first and second end tabs 54, 56, with a key-receiving gap 57 disposed between the first and second end tabs 54, 56. The first and second end tabs 54, 56 move between a first rest position and a second biased position, corresponding to the movement of the lock member 50 between its first locking configuration and its second unlocking configuration, respectively. The lock member 50 is operatively retained within the nozzle receiving recess 40 at an annular slot 44 in the inner surface 36 of the main body portion 34. The lock member 50 is resiliently deformable between a first locking configuration and a second unlocking configuration. The annular slot 44 is of a greater diameter than the arcuately shaped central portion 52 of the lock member 50 so as to accommodate expansion of the arcuately shaped central portion 52 when the lock member 50 is forced from its first locking configuration to its second locking configuration. The arcuately shaped central portion 52 of the lock member 50 preferably forms an arc of between from about 330° and about 350° so as to generally encircle the periphery of the gas outlet nozzle 20, thus maximizing the contact area between the lock member 50 and the back face 26 of the serrations 22 on the gas outlet nozzle 20. Preferably, the lock member is made from a spring metal material, and may be cut from common stock of about one-sixteenth inch in diameter for ease of manufacturing and for costs reduction purposes.

In the first locking configuration, when the cap member 30 is in place on the gas outlet nozzle 20, the central portion 52 of the lock member 50 is shaped and dimensioned to fit around a substantial portion of the gas outlet nozzle 20 so as to be in interfering relation with a juxtaposed one of the serrations 22 so as to thereby cause the cap member 30 to be locked on the gas outlet nozzle 20. When the lock member 50 is in its first locking configuration, it is in its first natural rest shape and the material is not stressed or biased. The lock member 50 is forced to its second unlocking configuration, as will be discussed in greater detail subsequently, whereat the material is biased or stretched, but not beyond it elastic limit. In the second unlocking configuration, the central portion 52 of the lock member 50 is shaped and dimensioned to be removable over the serrations of the gas outlet nozzle 20, so as to thereby permit the cap member 30 to be removed from the gas outlet nozzle.

The first and second end tabs 54, 56 are employed to interface with the key member 70 in such a manner so as to permit the key member 70 to expand the lock member 50 from its first locking configuration to its second unlocking configuration. The key receiving gap 57 is shaped and dimensioned to receive the key member 70 therebetween, when the key member 70 is appropriately inserted into the access passageway 60, with the key member 70 causing the first and second end tabs 54, 56 to expand from their first rest position to their second biased position.

The opposed outwardly projecting first and second end tabs 54, 56 extend radially outwardly from the nozzle receiving recess 40, through the access passageway 60 and extend into a notch 62 in the inner surface 36 of the nozzle receiving recess 40. The key-receiving gap 57 must be accessible by way of the access passageway 60. In order to keep the first and second end tabs 54, 56 of the lock member 50 in proper placement within the notch 62, and so as to keep the key receiving gap 57 generally centrally located within the access passageway 60, a centering projection in the form of a pin member 58 is interposed between the first and second end tabs 54, 56. The pin member 58 is securely inserted into a co-operating aperture 59 in the main body portion 34. The co-operating aperture 59 is drilled into the main body portion 34 from the first end 31 of the cap member 30. In actuality, the aperture 59 has a first portion 59a on one side of the notch 62 and a second portion 59b on the other opposed side of the notch 62.

An insertion slot 46 is cut in the main body portion 34 so as to be in communication with the nozzle receiving recess 40. The insertion slot 46 permits insertion of the lock member 50 into the nozzle receiving recess 40 at the annular slot 44. In order to preclude removal of the lock member 50 from the nozzle receiving recess 40 of the cap member 30 through the insertion slot 46, a stop means in the form of a pin member 48 is securely inserted into a co-operating aperture 49 in the main body portion 34. Again, the aperture 49 is drilled into the main body portion 34 from the first end 31 of the cap member 30. In actuality, the aperture 49 has a first portion 49a on one side of the insert slot 46 and a second portion 49b on the other opposed side of the insert slot 46.

Figure 6:
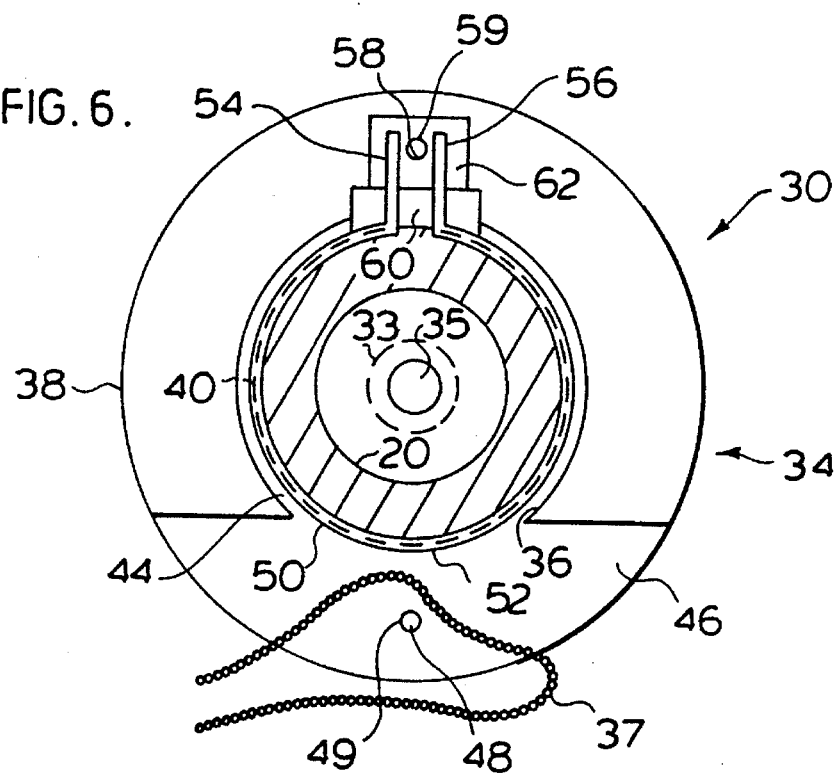
FIG. 6 is a sectional end view of the cap member of FIG. 2, taken along section line 6—6 of FIG. 3, with the lock member in its locking configuration.
Figure 7:
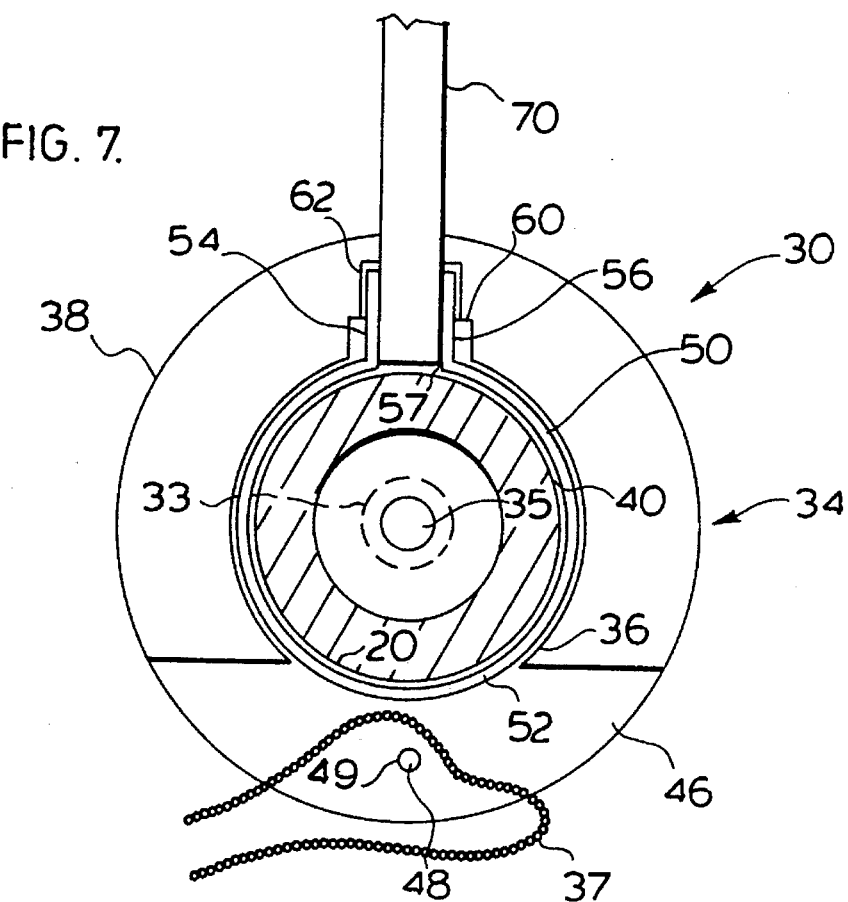
FIG. 7 is a sectional end view similar to FIG. 6, showing the key member (in cross-section) inserted between the opposed opposite ends of the locking member and the lock member in its unlocking configuration.

In use, in order to expand the lock member 50 from its first locking configuration to its second unlocking configuration, a key member 70 is used as will now be described in detail. The key member 70 is shaped and dimensioned by means of a bevelled front end 71, to urge the opposed outwardly projecting first and second end tabs 54, 56 from their first rest position, which first rest position corresponds to the first locking configuration of the lock member 50, to their second biased position, which second biased position corresponds to the second unlocking configuration of the lock member 50. In the preferred embodiment, the first rest position of the opposed outwardly projecting first and second end tabs 54, 56 is a relatively closed position—that is to say that the first end tab 54 and the second end tab 56 are quite close one to the other—as can be seen in FIG. 6—and is smaller than the diameter "D" of the key member 70. Further, the second biased position of the opposed outwardly projecting first and second end tabs 54, 56 is a relatively separated position—that is to say that the first end tab 54 and the second end tab 56 are farther apart one from the other than when in the relatively closed rest position and is substantially determined by the diameter "D" of the key member 70. The relatively separated second biased position is shown in FIG. 7. Upon insertion of the key member 70 into the gap 57 between the opposed outwardly projecting first and second end tabs 54, 56, the first and second end tabs 54, 56 are forced to their relatively separated second biased position thus causing the lock member 50 to realize its second unlocking configuration. The cap member 30 can then be removed from the gas outlet nozzle 20.

The opposed outwardly projecting first and second end tabs are generally parallel one to the other when they are in their first rest position—or at least within a few degrees of being parallel to one another—in order to permit the forces from the key member 70 being inserted therebetween to be used as fully as possible for spreading apart the first and second end tabs 54, 56.

Preferably, there is a nozzle abutment member 35 disposed at the second end 42 of the nozzle receiving recess 40, within a shallow indentation of the closed second end 32 of the cap member 30.

The cap member 30 may also include a retention chain 37 that is looped around the pin member 48 and around the base 23 of the gas outlet nozzle 20 to securely tie the cap member 30 to the gas outlet base 23 and thereby preclude the cap member 30 from becoming lost.

In an alternative embodiment of the present invention, it is envisioned that the opposed outwardly projecting first and second end tabs have a first rest position that is a relatively separated position—that is to say that the first end tab and: the second end tab are spread apart one from the other—and the second biased position of the opposed outwardly projecting first and second end tabs is a relatively closed position—that is to say that the first end tab and the second end tab are closer together one to the other than when in the relatively separated rest position.

Other modifications and alterations may be used in the design and manufacture of the apparatus of the present invention without departing from the spirit and scope of the accompanying claims.

What is claimed is:

1. A cap member for fitment over a gas outlet nozzle having a plurality of serrations on the exterior thereof, said cap member comprising:

an open first end and a generally closed second end;

a peripherally disposed main body portion spanning between said first end and said second end, and having an outer surface defining the periphery of said cap member and an inner surface defining a nozzle receiving recess extending inwardly from a first end concurrent with said open first end of said cap member to a second end concurrent with said closed second end of said cap member;

a lock member operatively retained within said nozzle receiving recess, said lock member having a slender elongate arcuately shaped central portion terminating in opposed outwardly projecting first and second end tabs having a key-receiving gap therebetween;

wherein said lock member is resiliently deformable between a first locking configuration whereat, when said cap member is in place on said gas outlet nozzle, said central portion of said lock member is shaped and dimensioned to fit around a substantial portion of said gas outlet nozzle so as to be in interfering relation with a juxtaposed one of said serrations so as to thereby cause said cap member to be locked on said gas outlet nozzle, and a second unlocking configuration whereat when said cap member is in place on said gas outlet nozzle, said central portion of said lock member is shaped and dimensioned to be removable over the serrations of said gas outlet nozzle so as to thereby permit said cap member to be removed from said gas outlet nozzle;

an access passageway in said peripherally disposed main body portion, which access passageway is shaped and dimensioned to removably receive a co-operating key member therein, so as to permit said key member to be inserted into said gap between said opposed outwardly projecting first and second end tabs, said key member being shaped and dimensioned to urge said opposed outwardly projecting first and second end tabs from a first rest position corresponding to the first locking configuration of said lock member to a second biased position corresponding to the second unlocking configuration of said lock member, upon insertion of said key member into said gap between said opposed outwardly projecting first and second end tabs.

2. The cap member of claim 1, wherein said lock member is retained at an annular slot in said inner surface of said main body portion.

3. The cap member of claim 1, wherein said slender elongate arcuately shaped central portion of said lock member forms an arc of between about 330° and about 350°.

4. The cap member of claim 1, further comprising a centering projection interposed between the opposed outwardly projecting first and second end tabs of said lock member to keep said gap generally centrally located within said access passageway.

5. The cap member of claim 4, wherein said centering projection is a pin member securely inserted into a co-operating aperture in said main body portion.

6. The cap member of claim 1, further comprising a insertion slot in said main body portion in communication with said nozzle receiving recess so as to permit insertion of said lock member into said nozzle receiving recess.

7. The cap member of claim 6, further comprising stop means to preclude removal of said lock member from said cap member through said insertion slot.

8. The cap member of claim 7, wherein said stop means is a pin member securely inserted into a co-operating aperture in said main body portion.

9. The cap member of claim 1, wherein said access passageway is in communication with said nozzle receiving recess.

10. The cap member of claim 9, wherein said access passageway is generally open to said nozzle receiving recess.

11. The cap member of claim 1, wherein said first rest position of said opposed outwardly projecting first and second end tabs is a relatively closed position and said second biased position of said opposed outwardly projecting first and second end tabs is a relatively separated position.

12. The cap member of claim 1, wherein said opposed outwardly projecting first and second end tabs are generally parallel one to the other when in said first rest position.

13. The cap member of claim 1, wherein said lock member is made from spring metal material.

14. The cap member of claim 13, wherein the natural rest shape of said lock member is its said first locking configuration.

15. The cap member of claim 1, wherein said main body portion is made from a metal material.

16. The cap member of claim 1, wherein said main body portion is made from a brass material.

17. The cap member of claim 1, further comprising a nozzle abutment member disposed at the second end of said nozzle receiving recess.

* * * * *